United States Patent
Andrejewski et al.

(10) Patent No.: US 7,183,372 B2
(45) Date of Patent: Feb. 27, 2007

(54) PREPARATION OF KETONE-FORMALDEHYDE RESINS

(75) Inventors: Werner Andrejewski, Dorsten (DE); Andreas Wenning, Nottuln (DE); Patrick Glöckner, Ratingen (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/922,909

(22) Filed: Aug. 23, 2004

(65) Prior Publication Data
US 2005/0080222 A1 Apr. 14, 2005

(30) Foreign Application Priority Data
Aug. 22, 2003 (DE) ................................ 103 38 559

(51) Int. Cl.
*C08G 2/18* (2006.01)
*C08G 6/02* (2006.01)

(52) U.S. Cl. ...................... 528/227; 528/220; 528/228; 528/482; 528/493; 528/495; 528/501; 528/503; 428/524

(58) Field of Classification Search ................ 528/220, 528/501, 503, 227, 228, 482, 493, 495; 428/524
See application file for complete search history.

(56) References Cited

U.S. PATENT DOCUMENTS 4,731,434 A * 3/1988 Dorffel ....................... 528/227

* cited by examiner

*Primary Examiner*—Duc Truong
(74) *Attorney, Agent, or Firm*—Oblon, Spivak, McClelland, Maier & Neustadt, P.C.

(57) ABSTRACT

A process for preparing ketone-formaldehyde resins, especially acetophenone- and cyclohexanone-formaldehyde resins, having a low water content and high thermal stability and yellowing resistance, and a process for their production and their use.

16 Claims, No Drawings

PREPARATION OF KETONE-FORMALDEHYDE RESINS

FIELD OF THE INVENTION

The invention relates to a process for preparing ketone-formaldehyde resins, especially acetophenone- and cyclohexanone-formaldehyde resins, having a low water content and high thermal stability and yellowing resistance, and a process for their production and their use.

DISCUSSION OF THE BACKGROUND

It is known that ketones or mixtures of ketones and aldehydes can be converted to resinous products in the presence of basic catalysts or acids. For instance, resins can be prepared from mixtures of cyclohexanone and methylcyclohexanone (Ullmann's Encyclopedia of Industrial Chemistry, Vol. 12, p. 551). Cyclohexanone and formaldehyde react to give hard resins which find use in the coatings industry.

Processes for preparing such products are described, for example, in U.S. Pat. No. 2,540,885, U.S. Pat. No. 2,540,886, DD 12433, DE 1300256, DE 2831613, DD 123481 and DE 1256898, all listed references are incorporated by reference.

According to DE 2831613, polycondensation products are obtained from aliphatic or cyclic ketones or mixtures of these ketones with aliphatic aldehydes in the presence of basic catalysts using from 0.005 to 10 mol %, based on the total amount of ketone and aldehyde, of a phase transfer catalyst. It is known to those skilled in the art that the process disclosed there can only provide resins having very high softening points and, as a result, high molecular weights. Since one use of the resins is in the coatings industry to reduce the solvent fraction, such high molecular weights are particularly disadvantageous. It is also known to those skilled in the art that cyclohexanone-formaldehyde resins lose their broad solubility properties at an excessively high molecular weight. Moreover, it is known to those skilled in the art that resins according to the processes described have low non-volatile fractions, which can have a negative influence on the thermal stability, and the yields of the process described are low.

It is also known that methyl ketones and cyclic ketones add to formaldehyde under preferably basic conditions to form the corresponding methylol compounds (stage 1). Depending on the pH and temperature, such methylol compounds dehydrate to form the corresponding vinyl ketones (stage 2). Under basic conditions, vinyl ketones in turn add to active hydrogens of the ketones by the mechanism of Michael addition, resulting in ketone-formaldehyde resins as the end product (stage 3).

In the processes used hitherto, formaldehyde is used in the form of 30 to 37% aqueous solutions. The catalyst consists of 50% aqueous sodium hydroxide solution or potassium hydroxide solution or a mixture of aqueous alkali and phase transfer catalyst.

The use of aqueous solutions and, for example, of sodium hydroxide solution greatly restricts the process in several respects:
(1) The ketones only have a limited solubility in water, so that, to achieve adequate reaction rates, large amounts of methanol or ethanol have to be used as solubilizers. These solvents reduce the space-time yield, lead to wastewater/waste air problems and are expensive to recover in a crude/purified form.
(2) The use of sodium hydroxide solution as a catalyst permits workup only by washing procedures which are particularly time-consuming. The necessary neutralization, for example, by means of acetic acid to give sodium acetate, additionally makes the wastewater costs more expensive.

SUMMARY OF THE INVENTION

Accordingly, it is an object of the present invention to find a process which eliminates the above-mentioned disadvantages. In particular, the process should firstly have a higher space-time yield and simultaneously greatly reduce the amounts of solvent and water used.

Surprisingly, a process for preparing ketone-formaldehyde has been found in which the aqueous formaldehyde solution has been replaced by 100% formaldehyde which is available on the market as paraformaldehyde or as trioxymethylene.

Additionally, a catalyst suitable for the process has been found in the lower tetraalkylammonium hydroxides ($C_1$–$C_5$), especially in tetraethylammonium hydroxide, especially in the form of the 15% to 40% by weight aqueous or alcoholic solution, but also including all of any positive amount including 20, 25, 30, and 35% by weight and all values and ranges in between all these listed values. The inventive catalyst can be removed by distillation, but has a sufficiently high basicity which is obligatory for stage 1, but in particular for stages 2 and 3.

DETAILED DESCRIPTION OF THE INVENTION

Thus, in a first embodiment, the present invention provides a process for preparing ketone-formaldehyde resins, which comprises: reacting
A) at least one ketone
and
B) paraformaldehyde
C) in the presence of 0.01–1.5 mol % of tetraalkylammonium hydroxide in the form of an aqueous or alcoholic solution as a catalyst, at temperatures in the range between 20 and 200° C.

In a preferred embodiment, the invention provides a process, which comprises the following three stages:
(1) adding paraformaldehyde to a ketone in the presence of a catalyst at a particular temperature, which ranges from 20 to 100° C., preferably from 30 to 80° C.,
(2) dehydrating and condensing with the addition of the catalyst at from 50 to 120° C., and
(3) removing the catalyst at temperatures from 120 to 200° C., preferably from 140 to 180° C.

Another preferred embodiment represents a process, which comprises the following two stages, wherein the second stage is omitted, but the dehydrating and condensing occur during the first stage. That is, this process comprises: the following two stages
(1) adding paraformaldehyde to the ketone in the presence of the catalyst at a particular temperature, which ranges from 20 to 100° C., preferably from 30 to 80° C., with simultaneous condensing and dehydrating, and
(3) removing the catalyst at temperatures between 120 and 200° C., preferably from 140 to 180° C.

Ketones which can be used in accordance with the invention are all ketones, e.g., aliphatic and/or cycloaliphatic ketones, alone or in mixtures. Examples of these ketones include, but are not limited to: cyclohexanone, acetophenone, methyl isobutyl ketone (MIBK), methyl ethyl ketone (MEK), trimethylcyclohexanone and isophorone, alone or in mixtures.

However, preference is given to using acetophenone, cyclohexanone, and trimethylcyclohexanone.

It is essential to the invention that paraformaldehyde is used in the underlying process. However, it is possible to employ 30–37 wt % aqueous formalin solutions, but also including all of any positive amount including 31, 32, 33, 34, 35, and 36 wt % and all values and ranges in between all these listed values; although the high space-time yield is then lost.

The polymeric form of formaldehyde is known as paraformaldehyde, which is formed when aqueous formaldehyde solutions are concentrated by evaporation and is reversibly dissociated into the monomers by supplying heat or by the action of acid. When the formaldehyde solution is stored for a prolonged time or concentrated over sulfuric acid, a finely crystalline, colorless mass of linear polyoxymethylene glycols of the general formula H—(O—$CH_2$)$_n$—OH where n=from 8 to 100 (paraformaldehyde) is formed.

According to the invention, tetraalkylammonium hydroxides can be used as a catalyst. In principle, all compounds of the formula may be used

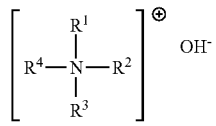

where $R_1$–$R_4$ are simultaneously or each independently linear or branched $C_1$–$C_5$-alkyl radicals. In a preferred embodiment of the invention, tetraethylammonium hydroxide is used.

In general, the catalyst is used in the process according to the invention as a 15 to 40 wt % aqueous or alcoholic solution, but also including all of any positive amount including 20, 25, 30, and 35% by weight and all values and ranges in between all these listed values.

In general, the process can be carried out at temperatures from 20 to 200° C., but also including all of any of the following listed temperatures (in ° C.): 30, 40, 50, 60, 70, 80, 90, 100, 110, 120, 130, 140, 150, 160, 170, 180, and 190 and all values and ranges in between all these listed values. It is possible to perform the process in the presence or preferably in the absence of at least one added solvent. In the case where there is no added solvent, the ketone serves in whole, or in part, as the reaction solvent. Depending on the starting materials, the overall time of the reaction is from 30 to 300 minutes, but also including all of any of the following listed times (in min.): 40, 60, 80, 100, 120, 140, 160, 180, 200, 220, 240, 260, and 280 and all values and ranges in between all these listed values. The space-time yields are 80–99%, but also including all of any of the following listed ranges (in %): 82, 84, 86, 88, 90, 92, 94, 96, and 98 and all values and ranges in between all these listed values.

The ketones are mixed directly with paraformaldehyde and converted to the methylol compound at room temperature or slightly elevated temperature using tetraalkylammonium hydroxide as a catalyst. On completion of this reaction, as evidenced by the cessation of heat generated by the reaction, dehydration and condensation are optionally effected by further addition of catalyst at 50–120° C., but also including all of any of the following listed temperatures (in ° C.): 60, 70, 80, 90, 100, 110 and all values and ranges in between all these listed values. The water which is formed during the course of the reaction is distilled off until the condensation is substantially completed. The temperature is then increased and the catalyst destroyed at 140–180° C., but also including all of any of the following listed temperatures (in ° C.): 150, 160, and 170 and all values and ranges in between all these listed values. The reaction is complete when a moist pH paper in the offgas stream no longer gives a basic reaction. The resulting resins are very light-colored and thermally stable, and have only low volatility at elevated temperatures.

The proposed process has the following advantages:
(1) high space-time yield,
(2) dispensation with organic auxiliary solvents,
(3) no wastewater resulting from the removal of the catalyst by distillation,
(4) high yield resulting from efficient conversion of the component,
(5) selective preparation of different types of resin, and
(6) greatly reduced running times, which taken alone or together gives rise to superior results.

Preference is given to carrying out the process in two or three stages. When the process is carried out in three stages, the process comprises the following three stages:
(1) adding paraformaldehyde to the ketone in the presence of a catalyst at temperatures in the range between 20 and 100° C., preferably from 30 to 80° C.,
(2) dehydrating and condensing at from 50 to 120° C.,
(3) removing the catalyst at temperatures between 120 and 200° C., preferably from 140 to 180° C.

The two-stage process, comprises the following two stages:
(1) adding paraformaldehyde to the ketone in the presence of the catalyst at temperatures in the range between 20 and 100° C. and simultaneously condensing and dehydrating,
(3) removing the catalyst at temperatures between 120 and 200° C., preferably from 140 to 180° C.

It is possible by the process according to the invention to prepare five different types of resin: type 0, type 1, type 2, type 3, and type 4. The types are illustrated hereinbelow:

type 0 (0)

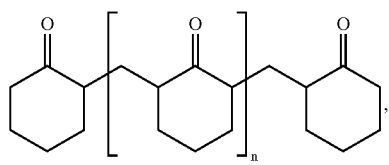

wherein n=1, 2, 3, 4, 5, 6, 7, 8, 9, or 10;

type 1 (1)

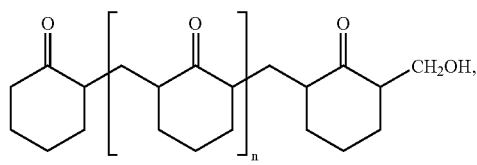

wherein n=1, 2, 3, 4, 5, 6, 7, 8, 9, or 10;

type 2

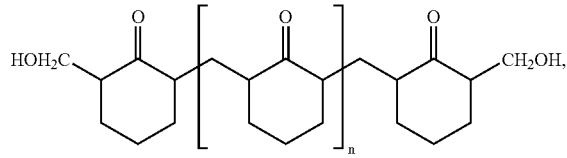

(2)

wherein n=1, 2, 3, 4, 5, 6, 7, 8, 9, or 10;

type 3

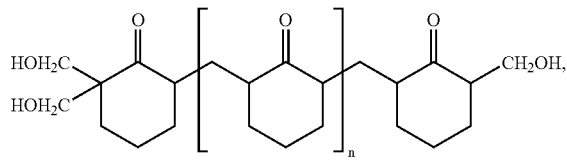

(3)

wherein n=1, 2, 3, 4, 5, 6, 7, 8, 9, or 10; and and type 4

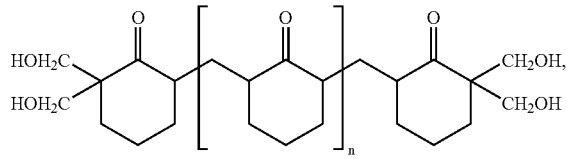

(4)

wherein n=1, 2, 3, 4, 5, 6, 7, 8, 9, or 10.

Surprisingly, novel types 0 and 4 are prepared by the process according to the invention.

The invention accordingly provides cyclohexanone-formaldehyde resins of type 0 and type 4 and also mixtures thereof of the formula type 0

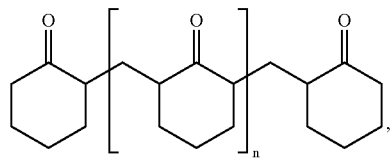

(0)

wherein n=1, 2, 3, 4, 5, 6, 7, 8, 9, or 10;

and/or type 4

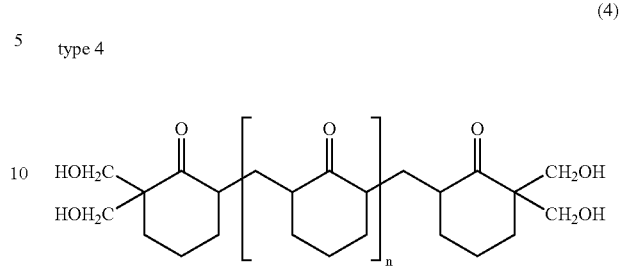

(4)

wherein n=1, 2, 3, 4, 5, 6, 7, 8, 9, or 10

Additionally, the invention provides cyclohexanone-formaldehyde resins that comprise a mixture of at least one compound represented by the following formula:

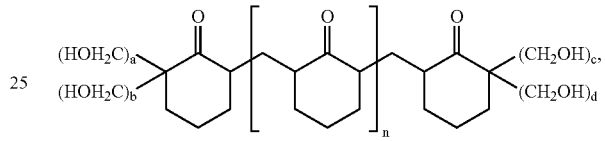

wherein n=1, 2, 3, 4, 5, 6, 7, 8, 9, or 10; and wherein a, b, c, and d are independently equal to 0 or 1.

The inventive resins composed of cyclohexanone and paraformaldehyde are prepared by the process according to the invention as described above.

The inventive process products and also the inventive resins (type 0 and type 4) have the following properties:

(1) soluble in alcohols, especially ethanol, and/or aromatics, especially xylene;

(2) a water content of less the 0.4% by weight, especially below 0.3% by weight;

(3) high thermal stability, i.e. low tendency to undergo yellowing during thermal stress;

(4) the fraction of non-volatile constituents is at least 99.4% by weight, as determined by heating for 1 h at 160° C.;

(5) a glass transition temperature (or softening point) between 10 and 110° C., preferably between 40 and 90° C., more preferably between 50 and 80° C.;

(6) a hydroxyl number between 0 and 700 mg KOH/g, preferably between 5 and 200 mg KOH/g (7) molar mass or molecular weights, $M_n$, of 300–5000 g/mol, preferably of 400–900 g/mol The inventively prepared resins and the inventive resins of types 0–4 are versatile. They can be used as a main component, base component or additional component in coating materials, inks including printing inks, pigment pastes and tinting pastes, masterbatches, ballpoint pastes, polishes, adhesives, sealants and insulating materials, and, when the hydroxyl number is adequate, with isocyanates, isocyanate derivatives and/or amine resins as crosslinkers.

The invention also provides the use of the type 0 and 4 cyclohexanone-formaldehyde resins as a main component, base component or additional component in coating materials, inks including printing inks, pigment pastes and tinting pastes, masterbatches, ballpoint pastes, polishes, adhesives, sealants and insulating materials, especially with isocyanates, isocyanate derivatives and/or amine resins as crosslinkers.

Having generally described this invention, a further understanding can be obtained by reference to a certain example, which is provided herein for purposes of illustration only, and is not intended to be limiting unless otherwise specified.

EXAMPLE

The following admixture was carried out, in which cyclohexanone and paraformaldehyde were assumed to be 100% pure:

| Component | Amount | mol of component |
|---|---|---|
| Cyclohexanone | 196.00 g | 6 |
| Paraformaldehyde | 50.00 g | 5 |
| Tetraethylammonium hydroxide (TEAH), 40 wt % | 7.5 mL | 0.02 |

The resulting cyclohexanone-formaldehyde resin corresponds to the type 0.

Cyclohexanone and paraformaldehyde were initially charged in a 500 mL three-neck flask. Under nitrogen, 7.5 mL of 40 wt % TEAH solution were added in portions. Condensation was effected between 60 and 90° C. until the temperature rose no further and the pH of greater than 8 remained constant.

At this point in the condensation, the mixture was heated and the water of reaction which had formed distilled off. Afterward, the mixture was heated to 180° C. and the catalyst removed under vigorous stirring. The initially yellow to brown resins become ever lighter with progressive removal of the catalyst. After cooling, 214 g (yield: 87%) of light-colored resin were isolated. The overall reaction time was 210 minutes.

Advantages of the process according to the invention are:
(1) high yield;
(2) reduction of the running time to about one-third of conventional processes;
(3) no wastewater; and
(4) thermally stable resins.

The priority document of the present application, DE Application No. 10338559.2, filed Aug. 22, 2003, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A process for preparing ketone-formaldehyde resins, which comprises:
reacting
at least one ketone
and
paraformaldehyde
in the presence of a catalyst consisting of 0.01–1.5 mol % of tetraalkylammonium hydroxide in an aqueous or alcoholic solution,
at temperatures in the range from 20 to 200° C.

2. The process of claim 1,
wherein said reacting comprises three stages, which comprises:
(1) adding paraformaldehyde to at least one ketone in the presence of the catalyst at temperatures in the range between 20 and 100° C.,
(2) dehydrating and condensing with the addition of the catalyst at from 50 to 120° C., and
(3) removing of the catalyst at temperatures between 120 and 200° C.

3. The process of claim 1,
wherein said reacting comprises two stages, which excludes a stage 2 and comprises:
(1) adding paraformaldehyde to at least one ketone in the presence of the catalyst at temperatures in the range between 20 and 100° C. and simultaneous condensation and dehydration, and
(3) removing the catalyst at temperatures between 120 and 200° C.

4. The process as claimed in claim 1, wherein at least one ketone is at least one aliphatic ketone and/or at least one cycloaliphatic ketone.

5. The process of claim 1, wherein at least one ketone is selected from the group consisting of cyclohexanone, acetophenone, methyl isobutyl ketone, methyl ethyl ketone, trimethylcyclohexanone, isophorone, and mixtures thereof.

6. The process of as claimed in claim 1, wherein the catalyst is defined by the formula

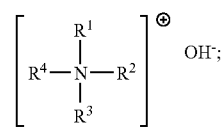

wherein $R_1$–$R_4$ are, simultaneously or each independently, linear or branched $C_1$–$C_5$-alkyl radicals.

7. The process as claimed in claim 1, wherein the tetraalkylammonium hydroxide is tetraethylammonium hydroxide.

8. The process as claimed in claim 1, wherein the catalyst comprises 15–40 wt % aqueous or alcoholic solution.

9. The process as claimed in claim 1, wherein the reacting occurs in the absence of an added solvent.

10. A composition prepared by a process as claimed in claim 1, comprising:
at least one compound of formula type 0

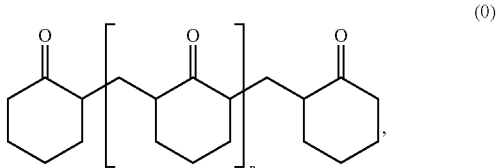

wherein n=1, 2, 3, 4, 5, 6, 7, 8, 9, or 10.

11. A composition prepared by a process as claimed in claim 1, comprising:

at least one compound of formula type 1

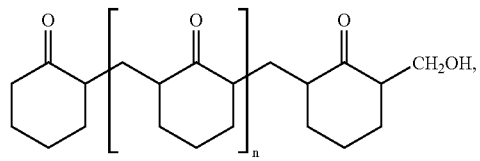
(1)

wherein n=1, 2, 3, 4, 5, 6, 7, 8, 9, or 10.

12. A composition prepared by a process as claimed in claim 1, comprising:

at least one compound of formula type 2,

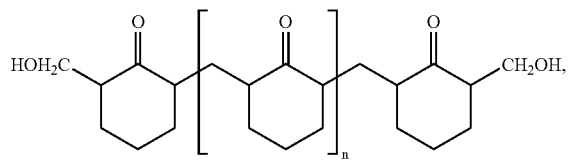
(2)

wherein n=1, 2, 3, 4, 5, 6, 7, 8, 9, or 10.

13. A composition prepared by a process as claimed in claim 1, comprising:

at least one compound of formula type 3

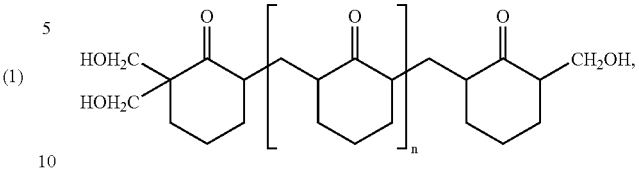
(3)

wherein n=1, 2, 3, 4, 5, 6, 7, 8, 9, or 10.

14. A composition prepared by a process as claimed in claim 1, comprising:

at least one compound of formula type 4

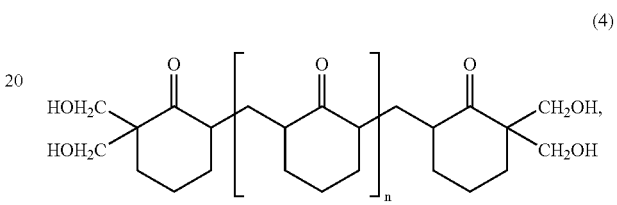
(4)

wherein n=1, 2, 3, 4, 5, 6, 7, 8, 9, or 10.

15. A process as claimed in claim 1, which further comprises:

contacting at least one isocyanate, or derivative thereof, with the resultant ketone-formaldehyde resin.

16. A process as claimed in claim 1, which further comprises:

contacting at least one composition comprising an amine, with the resultant ketone-formaldehyde resin.

* * * * *